Figures 1, 2:
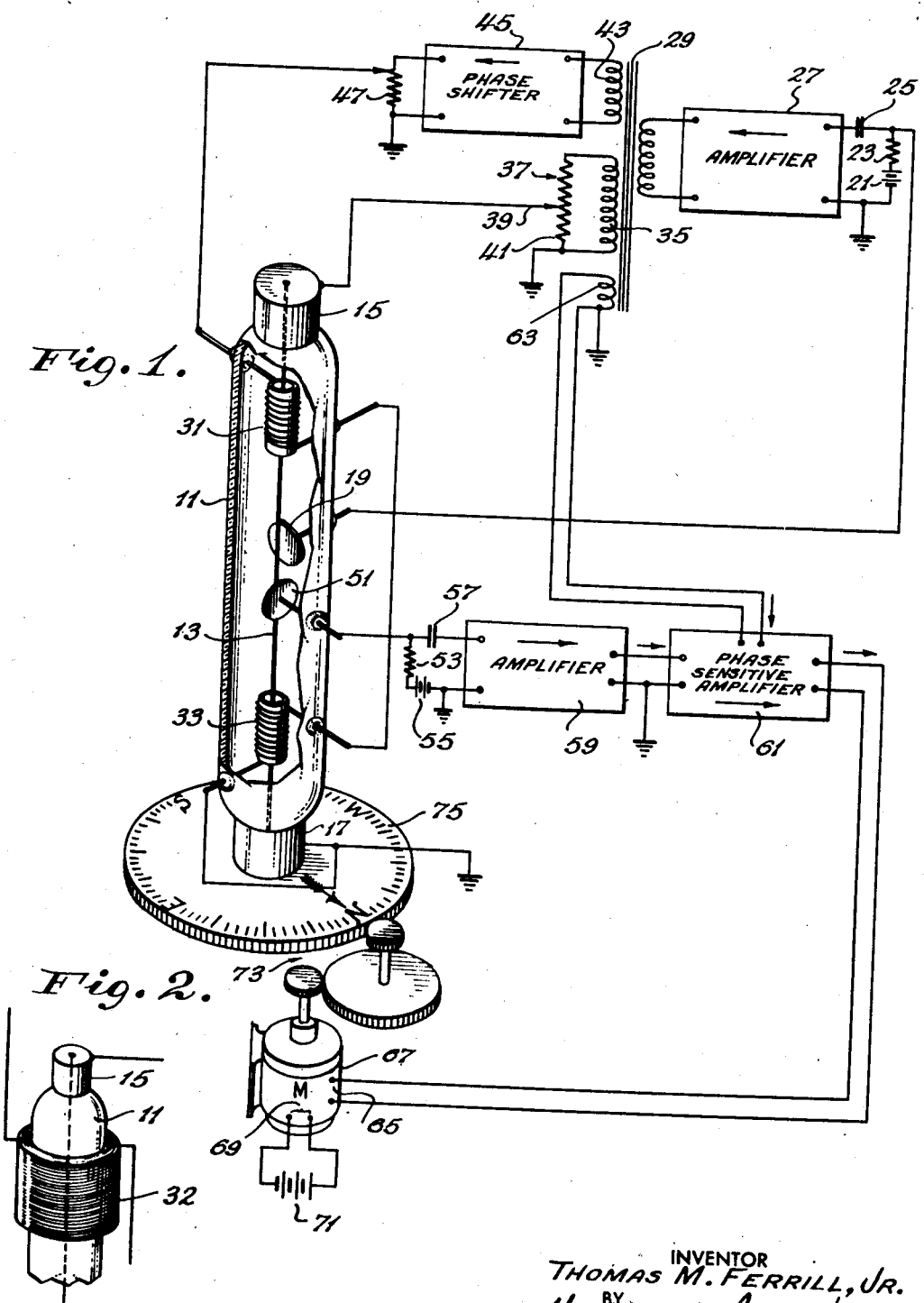

April 5, 1949.

T. M. FERRILL, JR 2,466,018

VIBRATORY STRAND REFERENCE APPARATUS WITH
LONGITUDINAL COMPONENT DRIVE

Filed Aug. 2, 1946

INVENTOR
THOMAS M. FERRILL, JR.
BY
Herbert H. Thompson
ATTORNEY.

Patented Apr. 5, 1949

2,466,018

UNITED STATES PATENT OFFICE 2,466,018

VIBRATORY STRAND REFERENCE APPARATUS WITH LONGITUDINAL COMPONENT DRIVE

Thomas M. Ferrill, Jr., Hempstead, N. Y., assignor to The Sperry Corporation, a corporation of Delaware Application August 2, 1946, Serial No. 688,157

21 Claims. (Cl. 318—489)

The present invention relates to stable reference apparatus, as is particularly concerned with apparatus for establishing and maintaining a predetermined direction in space by the employment of a vibrating element.

As set forth in patent application Serial No. 556,186, filed September 28, 1944, by the present inventor, there has heretofore been provided a stable reference system employing a relatively fine-gauge strand of elastic material stretched between two points in an evacuated supporting structure, and energized by alternating current passed through the strand at the resonant frequency thereof to produce vibration of the strand transversely of an ambient magnetic field. Capacitor pick-off elements energized by a direct voltage source were provided in that apparatus for producing alternating voltages corresponding to the perpendicular components of vibration of the strand. These perpendicular component voltages were applied to quadrature component resolving directional indicator apparatus such as either a "Telegon" or a cathode ray oscilloscope, for continuously indicating the direction of vibration of the strand.

The evacuated supporting structure and the strand were carefully constructed of material of very high elastic efficiency, and the envelope was evacuated and sealed at an extremely low gas pressure, in order to reduce the losses accompanying vibrations of the strand to a minimum. This was done in order that the plane of vibration of the strand be endowed with extremely long-time stability, resulting from a very large ratio of stored energy to the energy supplied per cycle of vibration of the strand. The long-time stability of the plane of vibration of the strand in such a structure is directly dependent upon this ratio, commonly referred to as the "Q" of the strand, since the tightness of coupling of the strand vibration to the transverse directional driving forces necessarily varied inversely as the "Q" of the strand. If the strand had very low "Q," then such large transverse forces were needed to sustain vibration that the plane of vibration of the strand changed rapidly in response to divergence of direction of the driving forces. Such a condition would seriously impair the usefulness of the vibratory strand system for stable reference purposes.

An object of the present invention is to provide improved vibratory stable reference apparatus, and more particularly, it is an object of this invention to provide vibratory stable reference apparatus wherein the long-time stability of the plane of vibration of a vibratory element is not directly limited by the "Q" thereof, but may be carried appreciably beyond the limits normally imposed by the energy losses per cycle of vibration of the vibratory element.

In accordance with an important feature of the present invention, the burden of compensating for the loss of energy per cycle of vibration of a vibratory element, such as a tightly stretched strand, is borne largely by an arrangement for exerting periodic longitudinal drive upon the strand. Accordingly, as the contributions to the motive power of the strand are made principally longitudinal and only secondarily transverse, the influences of the transverse drive upon the plane of vibration of the strand, tending to change the plane of vibration in response to momentary changes of relative direction of the transverse driving component, are greatly suppressed, and hence the strand may be made to yield enhanced long-time stability even with a moderate "Q," e. g., with a "Q" of the order of 50,000 to 100,000.

In accordance with a further feature of this invention, the longitudinal drive component may be supplied by magnetostrictive action which involves magnetostrictive effects produced directly within the vibratory strand, by the action of a coil arranged to produce alternating magnetic fields substantially along the axis of the strand. As has been set forth heretofore in patent application Serial No. 556,186, a desirable arrangement for providing transverse drive for the strand involves the passage of alternating current through the strand within an ambient transverse magnetic field. Such a transverse drive is here combined with the magnetostrictive longitudinal drive, in such a way that currents of the frequency of transverse vibration of the strand are employed both for passage directly through the strand and for passage through the longitudinal excitation coils, the ratios of these currents being regulated according to the desired relative magnitudes of the longitudinal drive component and the transverse drive component. By the magnetostrictive action, the tension of the strand is varied through two cycles in each cycle of the alternating current through the magnetostrictive coils. This is desirable, since there are two cycles of elongation and contraction of the strand per cycle of transverse vibration thereof.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Further objects will become apparent and the above objects and features will be more fully understood by reference to the following description of an embodiment of the present invention, taken in conjunction with the drawing, wherein Fig. 1 is a schematic representation of vibratory stable reference apparatus constructed in accordance with the present invention, and Fig. 2 is a fragmentary view representing a modification of the structure shown in Fig. 1.

Fig. 1 illustrates vibratory stable reference apparatus including a rigid envelope 11 of dielectric material such as glass or quartz, within which is suspended a slender strand 13 of elastic material such as nickel or a nickel-iron alloy, or an alloy which may contain nickel, iron and cobalt or chromium, if desired. Such a material is susceptible to magnetostrictive elongation and contraction, and is selected primarily for this property. The strand 13 may be attached at its ends to ferrules 15 and 17 sealed to the ends of the envelope 11.

An arrangement is provided for maintaining the strand 13 in transverse planar vibration. This arrangement includes a capacitor pick-off element 19 energized by a source 21 through a resistor 23, and coupled through a capacitor 25 to the input circuit of an amplifier 27. Amplifier 27 has its output circuit coupled through a transformer 29 both to the strand 13 and to a magnetostrictive driving system including coils 31 and 33. The transformer 29 includes one secondary winding 35 connected to a potentiometer 37, the movable tap 39 of the potentiometer and a grounded terminal 41 thereof being connected respectively to the upper ferrule 15 and the grounded lower ferrule 17, for application of alternating driving voltage directly to strand 13 and hence, for passage of alternating current therethrough. This alternating current through the strand 13 reacts with the component of an ambient magnetic field perpendicular to the strand 13 for inducing the strand 13 to vibrate in a plane through strand 13 perpendicular to the ambient magnetic field component.

A further secondary winding 43 of the transformer 29 is connected to the input circuit of a phase shifter 45, and the output circuit of the phase shifter is connected through a potentiometer 47 to the magnetostrictive driving coils 31 and 33. Coils 31, 33 are arranged in the envelope 11 in substantially coaxial positional arrangement with the strand 13, so that they produce magnetic fields extending along the strand. Through the phase shifter 45 and the potentiometer 47, these coils are energized with alternating current at the frequency of the current through the strand 13; and accordingly, they produce alternating magnetic fields along the strand 13 of this frequency. The magnetostrictive drive is non-polarized, however, so that the strand 13 responds in the same way to a positive half-cycle of the alternating current through the coils 31, 33 as it does to the negative half-cycle of the current. Accordingly, two cycles of contractive and expansive forces are produced in the strand 13 by each cycle of alternating current through coils 31 and 33. The longitudinal forces thus exerted tend to sustain transverse vibration of the strand 13 at its natural period of vibration.

Coils 31, 33 may be made to exert sufficiently strong forces on the strand 13 to provide full compensation for energy loss accompanying transverse vibratory movement of this strand, as due both to gas damping within the envelope 11 and to the molecular friction within strand 13 caused by the alternate elongation and contraction thereof. Under such a condition, the strand 13 would be retained in transverse vibration even if potentiometer 37 were adjusted for zero output voltage, eliminating the current through the strand 13, and accordingly, eliminating the transverse drive component therefor. However, in most practical applications, it is desirable that some degree of control be exercised upon the strand to regulate the direction of vibration thereof. Accordingly, the longitudinal drive current is adjusted to a condition of insufficiency for fully sustaining the vibration of the strand 13, and the potentiometer 37 is adjusted in such a way that the deficiency of the longitudinal drive is made up by the transverse driving forces exerted by the electric motor reaction of the alternating current through strand 13 with the ambient magnetic field component.

In order to facilitate the ideal proportioning of the settings of potentiometers 37 and 47 for a desired degree of transverse control over the plane of vibration of strand 13, and to facilitate the adjustment of these potentiometers to a condition in which the total driving forces acting upon the strand 13 are just sufficient to maintain the vibration thereof at a desired constant amplitude, amplifier 27 may include an amplitude limiting stage or an automatic gain control circuit arranged to suppress changes of output voltage of the amplifier. Such circuits are not absolutely essential, however, as amplifiers are inherently limited by the characteristics of the vacuum tubes and supply circuits ordinarily provided.

For convenience in utilization of the stable reference propensities afforded by the vibration of strand 13, a second capacitor pick-off plate 51 may be supported in proximity to the strand 13, and may be arranged to supply an alternating signal upon angular departure about the axis of strand 13 from a predetermined angular relation between the plane of vibration of strand 13 and the envelope 11. Capacitor pick-off element 51 may be energized by a voltage source 55 through a resistor 53, and may be coupled through a capacitor 57 to the input circuit of an amplifier 59 arranged to supply an amplified alternating voltage to the input circuit of a phase sensitive amplifier 61. Unit 61 is supplied with a phase reference voltage by an auxiliary secondary winding 63 of transformer 29, and this amplifier 61 supplies a direct output voltage of magnitude and polarity varying according to the amplitude of the voltage supplied from amplifier 59 and the phase of this voltage relative to the phase of the voltage from secondary winding 63.

The output voltage from phase sensitive amplifier 61 may be supplied to control terminals such as field winding terminals of a reversible motor 67, which may have a principal pair power input terminals such as armature terminals 69 supplied by a separate source, e. g. battery 71. The motor 67 is coupled through gear train 73 to a large gear element 75 connected to the vibratory unit 11, 15, 17 and arranged to rotate the supporting structure of strand 13, and accordingly, the strand 13 itself, in such a way as to suppress the alternating voltage developed in capacitor pick-off element 51.

The assembly including the gear element 75 and envelope 11 and the elements fixed within envelope 11 may be pivotally suspended in a craft such as an aircraft for rotation about a vertical axis. In such a use of the invention, the motor 67 is fixed to the aircraft and employed for retaining gear element 75 and the elements associated therewith fixed in space about the vertical axis, by reference to the plane of vibration of the strand 13. This system then serves as a stabilized magnetic compass, if the earth's magnetic field is employed as the ambient field for reaction with the current through the strand 13. Where the earth's magnetic field is thus permitted to act directly on the strand, the strand 13 vibrates in the vertical east-west plane, i. e., in the vertical plane perpendicular to the horizontal component of the earth's magnetic field. Accordingly, element 75 may be engraved with compass rose directional designations, the east-west designations being aligned parallel with the effective surface of capacitor element 51.

With this arrangement, so long as element 75 remains properly oriented in space relative to the earth's magnetic field, the strand 13 vibrates in a plane parallel with the surface of capacitor 51, and accordingly, the capacitance therebetween remains constant, so that no voltage appears at the input or output terminals of amplifier 59 or at the output terminals of the phase sensitive amplifier 61. During this time, therefore, motor 67 is inactive. Upon rotation of the craft about the vertical axis, however, as when a turn of the craft is commenced, there is a tendency to turn gear element 75 from its predetermined orientation relative to the earth's field, and as it commences to revolve with the craft, an alternating voltage is supplied to the input circuit of amplifier 59 as the face of pick-off element 51 becomes non-parallel with the plane of vibration of the strand 13. Under these conditions, the phase sensitive amplifier 61 supplies to motor 67 a voltage of the polarity required to urge element 75 in the direction to restore the correct alignment between capacitor element 51 and the plane of vibration of the strand 13. Units 51, 59, 61 and 67 therefore act in such a manner as to retain the supporting structure surrounding strand 13 in a predetermined alignment with the plane of vibration of strand 13, and hence, to hold the directionally calibrated element 75 in correct orientation in azimuth relative to the earth's magnetic field.

In Fig. 1, the magnetostrictive driving coils 31, 33 are illustrated as supported within envelope 11 for concentration of their magnetic fields about the strand 13. If desired, however, as shown in the fragmentary view in Fig. 2, these internal magnetostrictive coils may be replaced by one or more external coils such as the coil 32, surrounding the envelope 11. While part or all of the magnetostrictive drive could be exercised upon the ferrules 15 and 17, if desired, such a drive arrangement is considered inferior to the drive exerted directly upon the strand 13, in view of the difficulty of providing such precision of symmetry of the ferrules 15 and 17 and such homogeneity in their structure as to insure longitudinal drive forces exerted on the strand 13 with freedom from a transverse component of motion. By the exercise of the magnetostrictive forces directly within a magnetostrictively susceptible strand 13, such transverse disturbance is minimized or substantially eliminated.

While the present invention has been illustrated as employed for providing a stable reference about a vertical axis, and more particularly, for providing a stable reference about a vertical axis in predetermined relation to the direction of the horizontal component of the earth's magnetic field, it will be readily apparent that the longitudinal drive features of the present invention are readily usable in other arrangements, as for example, where the ambient magnetic field for sustaining vibration is provided by a local magnetic system, whether the strand is normally aligned vertically or horizontally, or in a direction of intermediate inclination.

While the features of the present invention relieve to some extent the dependency upon obtaining very high "Q" of the vibratory system for enhancement of stability thereof, and make possible the provision of a moderately long-time stability where the "Q" or the mechanical efficiency of the vibratory system is relatively low, it may none-the-less be desirable to provide relatively high "Q" in order that extremely high stability be achieved. For this reason, it is considered desirable to evacuate the envelope 11 after assembly of the strand 13 and other internal elements thereof, with the employment of the techniques generally used in the construction of electronic vacuum tubes. The degree of damping of the strand 13 is greatly dependent upon the gas pressure to which the envelope 11 is evacuated, so that a desired set of performance characteristics may be obtained according to the extent to which this structure is evacuated.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Stable reference apparatus comprising a supporting member, a strand of elastic material stretched between two points in said supporting member, magnetostrictive means for periodically varying the tension in said strand for providing transverse planar vibration of said strand to endow it with vibration directional stability, directional pick-off means for producing an output signal varying according to the direction of the transverse plane of vibration of said strand, and means responsive to said signal for controlling the direction of said pick-off means to maintain a predetermined directional relation between said pick-off means and the plane of vibration of the strand.

2. In combination, a supporting member, a strand of elastic and magnetostrictively susceptible material stretched between two points in said supporting member, means for producing an alternating magnetic field along said strand for periodically varying the tension thereof to provide vibratory motion of said strand, directional pick-off means coupled to the strand for producing an output signal varying according to the angular relation between the pick-off direction and the direction of vibration of the strand, and means for coercing said strand toward vibration in a predetermined direction.

3. In combination, a supporting member, a strand of elastic and magnetostrictively susceptible material stretched between two points in said supporting member, electromagnetic coil means aligned with said strand for producing a magnetic field extending therealong, and means responsive to vibratory movement of said strand for supplying to said coil means energizing alternating current of frequency and phase determined by the movement of said strand for sustaining vibration of said strand.

4. In combination, a supporting member, a strand of elastic material stretched between two points in said supporting member, alternating current means for varying the tension in said strand at a frequency double the frequency of the current, and means responsive to transverse vibration of said strand for supplying to said last-named means alternating current of the frequency of transverse vibration of said strand, whereby the tension of said strand is varied at the frequency of the elongation and contraction thereof.

5. In combination, a supporting member, a strand of elastic material stretched between two points in said supporting member, alternating current responsive magnetostrictive means for exerting longitudinal forces on said strand at a frequency double the frequency of an applied current to cause transverse vibration of said strand, and means responsive to transverse vibration of said strand for supplying to said last-named means alternating current of the frequency of transverse vibration of said strand, whereby the tension of said strand is varied at the frequency of the elongation and contraction thereof.

6. In combination, a supporting member, a strand of elastic material stretched between two points in said supporting member, means for exerting both relatively great alternating longitudinal forces and relatively slight alternating transverse forces on said strand, and means responsive to transverse vibration of said strand for controlling the frequency of said force exerting means whereby said strand is transversely vibrated for endowment with orientational stability and the transverse directional influence is rendered relatively slight accordingly as the vibration sustaining power is principally supplied by the longitudinal forces.

7. In combination, a supporting member, a strand of elastic and magnetostrictive material stretched between two points in said supporting member, and means for magnetostrictively exerting alternating longitudinal forces on said strand and for electromagnetically exerting alternating transverse forces on said strand whereby said strand is transversely vibrated for endowment with orientational stability in a plane determined by the time integral of the directions of transverse drive over a period rendered relatively long accordingly as the vibration sustaining power for said strand is principally supplied by the longitudinal magnetostrictive force exerted thereon.

8. In combination, a supporting member, a strand of elastic material stretched between two points in said supporting member, and means for passing alternating current through said strand to provide transverse force reaction with an ambient magnetic field and for exerting alternating longitudinal forces on said strand, whereby said strand is maintained in vibration transverse said ambient magnetic field and endowed with orientational stability transverse said field, said means being so constructed and arranged that the vibration sustaining power supplied through said longitudinal forces exceeds the power supplied through said transverse forces, whereby the transverse directional influence of said field is rendered relatively slight.

9. In combination, a supporting member, a strand of elastic and magnetostrictively susceptible material stretched between two points in said supporting member, and means for passing alternating current through said strand for producing transverse force reactions with an ambient magnetic field and for providing an alternating magnetic field component along said strand for exerting alternating longitudinal forces thereon, whereby said strand is vibrated transversely of said ambient magnetic field and thereby endowed with orientational stability, and the burden of sustaining the vibration of said strand is partially borne by the magnetostrictive drive in such a way as to limit the directional coercion on the direction of vibration of said strand due to the force reactions in said ambient magnetic field.

10. In combination, a supporting member, a strand of elastic material stretched between two points in said supporting member, and means for exerting both alternating longitudinal forces and alternating transverse forces on said strand, said alternating longitudinal forces including a component at twice the frequency of the alternating transverse forces, whereby said strand is transversely vibrated for endowment of orientational stability and such a part of the burden of sustaining the vibration of said strand is borne by the longitudinal drive forces as to limit the transverse directional coercion on said strand for long-time stability thereof.

11. In combination, a supporting member, a strand of elastic material stretched between two points in said supporting member, means responsive to vibration of said strand for producing an alternating current at the frequency of vibration of said strand, and means utilizing said alternating current for exerting alternating transverse forces on said strand at the frequency of said current and for exerting alternating longitudinal forces on said strand at a frequency twice the frequency of said current whereby said strand is transversely vibrated at its natural frequency for endowment with orientational stability and a predetermined part of the burden of sustaining the vibration of said strand is made noncoercive as to the direction of transverse vibration thereof for enhancement of the long-time stability of the direction of vibration of the strand.

12. Stable reference apparatus comprising a tubular envelope, a strand of elastic material stretched between two points axially displaced along said envelope, said envelope being substantially evacuated to minimize damping of vibration of said strand, and electromagnetic coil means fixed to said envelope in substantially coaxial relation with said strand and adapted to be energized by alternating current for periodically varying the tension in said strand to provide transverse plane of vibration of said strand and to endow it with vibration directional stability.

13. In combination, a tubular envelope, a strand of elastic and magnetostrictively susceptible material stretched between two points axially displaced in said envelope, said envelope being substantially evacuated to minimize gaseous damping of vibration of said strand, and means including an electromagnetic coil fixed to said envelope in a position of substantially coaxial alignment with said strand for producing an alternating magnetic field along said strand to vary the tension thereof periodically and thereby endow said strand with vibratory stability.

14. The combination defined in claim 13, wherein said coil is fixed within said envelope and surrounding said strand.

15. The combination defined in claim 13, wherein said coil surrounds said envelope.

16. The combination defined in claim 13, wherein a plurality of coils are provided axially displaced along said strand.

17. Stable reference apparatus comprising a vibratory member, magnetostrictive means for exerting alternating longitudinal forces on said member, said member being so arranged as to respond to said forces with vibratory movement transverse a predetermined axis, means pivotally supporting said supporting member for freedom about said predetermined axis, means for detecting angular deviation about said axis between said element and a plane in said supporting member normally aligned therewith, and motive means for rotating said supporting member about said axis to restore said predetermined alignment.

18. Stable reference apparatus as defined in claim 17, wherein said predetermined axis is vertical and said element is a strand of elastic material stretched vertically between two points in said supporting member, said apparatus further including means for passing an alternating current through said strand for exerting alternating transverse forces on said strand by motor reaction with the earth's magnetic field.

19. In combination, a longitudinally driven vibratory stable reference element, means for exerting varying directional transverse forces thereon, and directional vibration pick-off means coupled to said element to produce an output signal varying according to its direction of vibration.

20. A stable reference element driven longitudinally by magnetostriction and synchronously driven transversely, and means including a vibration pick-off coupled to said element and an amplifier having an input circuit coupled to said pick-off for controlling the longitudinal and transverse drive of said element.

21. Stable reference apparatus comprising a supporting member, a strand of elastic material stretched between two points in said supporting member, magnetostrictive drive means coupled to said strand for varying the tension in said strand according to magnetic field variation in said means, and means responsive to transverse planar vibration of said strand for supplying to said magnetostrictive means an alternating electromotive force synchronous with the vibration of said strand for sustaining the vibration of the strand at its natural period.

THOMAS M. FERRILL, JR.

REFERENCES CITED

The following references are of record in the file of this patent:

UNITED STATES PATENTS

| Number | Name | Date |
|---|---|---|
| 1,616,416 | Fessenden | Feb. 1, 1927 |
| 2,120,985 | Melhose | June 21, 1938 |
| 2,223,537 | Sykes | Dec. 3, 1940 |